United States Patent Office 3,445,418
Patented May 20, 1969

3,445,418
ORGANOSILICON COMPOSITIONS
Robert Muir Gibbon, West Kilbride, and Edward Keith Pierpoint, Largs, Scotland, assignors to Imperial Chemical Industries Limited, London, England, a corporation of Great Britain
No Drawing. Filed Mar. 24, 1966, Ser. No. 536,961
Claims priority, application Great Britain Apr. 5, 1965, 14,328/65
Int. Cl. C08g 31/42
U.S. Cl. 260—33.6        21 Claims

ABSTRACT OF THE DISCLOSURE

A process for the production of a stable organosilicon solution is disclosed, wherein a diorganopolysiloxane having at least two silicon-bonded hydroxyl groups per molecule, a linear organopolysiloxane, a solvent-soluble stannous salt of a carboxylic acid and water are reacted together.

---

This invention relates to new and useful organosilicon compositions and more particularly to such compositions which can be used for the deposition of films on paper and like materials.

Organosilicon compositions are well known and a wide variety have been used for many purposes including the conferring of water repellency and anti-stick properties on paper. Many of these compositions are, however, not entirely satisfactory, for example in some cases a catalyst has to be incorporated in the composition and once incorporated the composition has a relatively poor pot life. This requires that it be used within a comparatively short time of adding the catalyst. In other cases, the deposited film is not entirely satisfactory, for example it is not always resistant to abrasion and can be removed to some extent by rubbing unless cured at high temperatures such as 120° C. In other cases where the film is deposited on paper to be used as a backing material for a fabric or other material coated with an adhesive, the organosilicon constituent of the composition tends to migrate into the adhesive resulting in a tendency to cause deterioration of the properties of the adhesive. One such composition hitherto proposed for use comprises a high molecular weight polysiloxane having an average of 1.9 to 2 organic radicals per silicon atom and having at least two silicon-bonded hydroxyl groups per molecule with a small proportion up to about 5 percent by weight of a low molecular weight organopolysiloxane having 3 or more units per molecule of the general formula RHSiO and having any remaining units of the general formula $R_3SiO_{0.5}$, in which R is a monovalent hydrocarbyl radical, and a catalyst which is a carboxylic acid salt of a metal such as tin or an organometallic compound. This composition requires the catalyst to be added immediately before use and has a comparatively short pot life when the catalyst is a carboxylic acid salt of a metal such as tin. Hence in such cases the catalysed composition must be used within a short time after adding the catalyst. It also happens on occasion that the operator forgets to add the catalyst. Again, even when the composition is properly used the film deopsited on paper from a solution of this composition does not always have adequate abrasion resistance and can easily be damaged by rubbing, unless curing is carried out at high temperatures. This is very frequently undesirable, because not all users are equipped or wish to lay out the necessary expenditure to be equipped for high temperature treatment and because many papers and like materials suffer damage when heated to high temperatures.

According to the present invention a process for the production of a new and useful organosilicon composition comprises reacting together in the presence of an organic solvent 100 parts by weight of a diorganopolysiloxane having at least two silicon-bonded hydroxyl groups per molecule, up to 2 parts by weight of a linear organopolysiloxane of viscosity not greater than 1000 cs. at 25° C. and consisting of RHSiO units with or without terminal $R_3SiO_{0.5}$ units, or up to a corresponding RHSiO weight content if the linear organopolysiloxane contains $R_2SiO$ units, where R is a monovalent hydrocarbyl radical or substituted monovalent hydrocarbyl radical, 0.45 to 3.0 part by weight of tin in the form of a stannous salt of a carboxylic acid and 0.1 to 0.5 part by weight of water.

A wide variety of diorganopolysiloxanes may be used in the process of our invention. It is, however, preferred that it should be of molecular weight such that the penetration, as hereinafter defined, is not more than 3000. The organo groups in the diorganopolysiloxane may be selected from a wide variety of alkyl, aryl, aralkyl, alkaryl, cycloalkyl and alkenyl groups or such groups containing various substituents for example such as methyl, ethyl, vinyl, phenyl, chlorophenyl, γ-cyanopropyl or trifluoropropyl. It is, however, in general preferred that at least a major proportion of the organo groups be methyl groups and it is further preferred that all the organo groups be methyl groups.

The linear organopolysiloxane is preferably end-stopped with triorganosilyl groups and may otherwise consist entirely of mono-organosiloxy groups or may have a proportion of diorganosiloxy groups. A wide variety of organo groups may be present in this organopolysiloxane. These may be alkyl, aryl, aralkyl, alkaryl, alkenyl or cycloalkyl groups, for example, such as methyl, ethyl or phenyl groups. It is, however, normally preferred that the organo groups be methyl groups.

A wide variety of stannous salts of carboxylic acids may be used, it being essentially only that the salt chosen be soluble in the solvent in which the reaction is to take place. Suitable stannous salts include, for example stannous octoate, stannous oleate, stannous stearate and stannous versatate. It is, however, in general preferred to use stannous octoate. While the amount of stannous salt may vary from 0.45 to 3.0 parts by weight of tin per 100 parts by weight of the diorganopolysiloxane, it is in general preferred that it should be from 0.6 to 1.5 part by weight of tin.

A wide variety of solvents may be used in carrying out the reaction. Suitable solvents which may be used include, for example, white spirit, toluene, benzene, xylene, carbon tetrachloride and perchloroethylene. Toluene is, however, normally preferred as the solvent, but in cases where a non-inflammable solvent is required perchlorethylene is preferred. The solvent may be used in amounts such that the total solids content of the solution is up to 25 percent by weight or more, but it is in many cases preferred to have a total solids content of from 8 to 14 percent. After reaction some of the solvent may be removed if desired, without affecting the stability of the product, thus sufficient solvent may be removed to increase the concentration of the solution up to, for example, 50 percent by weight of total solids. The solution may, of course, be diluted before use.

The reaction should be carried out at a temperature such that the water to be reacted is not removed by azeotropic distillation or other physical means. The reaction occurs slowly at temperatures around 20° C. but increases in speed with elevation of temperature. In general it is convenient to react at a temperature of from 50 to 100° C. and preferably at from 60 to 80° C. In some cases a gel is first formed and redissolved on further reaction in less than 2 hours. Reaction is normally complete in from 30 minutes to 5 hours. It is, of course, in many cases desirable that any water present originally in the diorganopolysiloxane or in the solvent should be removed particularly since the amount present is not normally known, for example, by heating and distilling off the water as an azeotrope with the solvent before the linear organopolysiloxane and stannous salt are added to the reaction mixture. Any solvent removed in this way may be returned to the mixture before reaction is started.

The compositions of our invention are stable for prolonged periods and may be used for film-forming purposes provided that the solvent is not removed. When the solvent is removed the compositions will then cure to an elastomeric state without the use of high temperatures. Many of the compositions when deposited on a surface such as paper or the like and the solvent removed will give an excellent anti-stick surface with high abrasion resistance. Such treated paper is of value as a backing for such things as adhesive tapes, the particular composition used being chosen according to the adhesive on the tape.

Our invention is further illustrated by the following examples, in which all parts and percentages are by weight.

EXAMPLE 1

15 parts of a hydroxy-ended dimethylpolysiloxane of penetration value 500 was dissolved in 1350 parts of toluene and the water present in the solution removed by azeotropic distillation, the dry solvent being returned to the solution. The solution was then cooled to 70° C. and the temperature thereafter maintained at 70 to 75° C. 3 parts of stannous octoate (commercial stabilised material known as T9 and sold by Mesrs. Albright & Wilson Ltd.) dissolved in 9 parts of dry toluene were added and the mixture stirred for 15 minutes after which 0.23 part of water was added. After a further 15 minutes 1.36 parts of a linear trimethylsilyl-ended polymethylsiloxane, of viscosity 10.5 cs. at 25° C., dissolved in 12 parts of dry toluene were added in small portions over a period of 5 minutes. The mixture was maintained at 70 to 75° C. for a further two hours whereby there was obtained a clear solution of viscosity 2500 cs. at 25° C.

The solution so obtained was knife coated on an L.S. glazed cream paper weighing 100 gm. per sq. in. and of Gurley porosity greater than 1000 sec., such that the weight of siloxane deposited on the paper was approximately 1.0 g./m.² Portions of the coated paper were air dried at 20° C., for 3 minutes at 60° C. and for 3 minutes at 120° C. respectively. The resistance to abrasion was determined 30 minutes after the coating operation, the method used being as described hereinafter. Little or no staining was evident in any of the abraided samples.

For purposes of comparison, solutions of two commercially available non-migratory silicone paper treatments, Silicolease 423 (sold by I.C.I. Ltd.) and M.S. 2219 (sold by Midland Silicones Ltd.), made up and catalysed as recommended by the manufacturers, were also coated on the same grade of paper under similar conditions. The samples coated with the commercial treatments and cured at 20° C. or 60° C. for 3 minutes showed extensive staining when subjected to the abrasion test, showing them to have poor resistance to abrasion when cured at low temperatures. The staining occurring in the abraided samples cured at 120° C. was of the same order as that shown by portions coated with the composition prepared as described above.

The excellent release properties and lack of migration of the coating obtained using the composition of the invention is illustrated by the following result:

A yellow kraft paper was coated with the composition prepared as above to give a coating weight of approximately 1.0 gm. per sq. metre of siloxane, the coated paper dried in air at 60° C. for 3 minutes and thereafter allowed to age for 24 hours at 20–25° C. Laminates of 1″ wide pressure sensitive adhesive tape (peel strength 1700 g./in.) with the coated paper were prepared and kept under a load of 1 lb. per sq. in at 60° C. and a relative humidity of 80 percent for varying periods. The table shows the load required to strip the tape from the coated paper (release) and the load required to remove the same specimen of tape from a clean steel surface (subsequent adhesion). In both instances the tape was peeled off at a rate of 12 inches per minute.

| Age of laminate (days) | 1 | 7 | 27 |
|---|---|---|---|
| Release (g./in.) | 15 | 19 | 26 |
| Subsequent adhesion (g./in.) | 1,500 | 1,600 | 1,000 |

The compositions prepared as described above remained fluid in storage at 20–25° C. for longer than 3 months. The surprising increase in stability of this composition over simple mixtures of the ingredients is illustrated by the following experiment using mixtures of the same materials as those used in the preparation described above. Three solutions in toluene, A, B and C were prepared containing 10 percent of siloxane from mixtures containing respectively 4.65 parts, 2.34 parts or 1.15 parts of the linear polymethylsiloxane per 100 parts of the hydroxy-ended dimethylpolysiloxane. Stannous octoate was added to each solution in amount equal to 2.1 percent by weight of the siloxane present. Solutions A and B gelled within 1½ hours of the addition of the stannous octoate. Solution C gelled within 3 hours. These gels could not be redissolved by heating within 2 hours. Hence it can be seen that such compositions have not sufficient stability to be commercially useful. In contrast, the solution prepared above is seen to have a very much more useful life.

Determination of penetration value

The penetration value of a diorganopolysiloxane as referred to herein is the depth expressed in tenths of a millimeter to which a needle of the dimensions given below will penetrate a mass of diorganopolysiloxane during a period of 1 minute. In cases where the penetration value is greater than 300 it is calculated from the time taken for the needle to sink 3.00 cm.

The penetrometer used is that used for determination of hardness of bitumen according to the procedure of ASTMD–5, except that the needle used therein is replaced by one consisting of a steel cylinder ¼″ in diameter and ³⁄₁₆″ long attached to a shaft of diameter ⅛″ and 2″ long and the total load on the penetrometer is 100 g.

Resistance to abrasion of silicon treated paper

The resistance to abrasion of a siloxane film on paper is determined by assessing the area of wettable paper substrate exposed after being subjected to a standardised abrasive load. The wettable portions of the paper are observed by painting with an aqueous dye solution. The abrasive load is arranged as follows:

A cylindrical rubber plug ⅜ inch long and ⁵⁄₁₆ inch diameter, cut from a tracing eraser ("Colonel" brand, No. 1202, made in Great Britain) is impalled on a ¼ inch long spike carried at the end of a counterbalanced pivoted arm and perpendicular thereto, the pivot being 6 to 8 inches from the spike. The arm is so arranged that a strip of paper about 6 inches x 2 inches may be drawn beneath the arm in the direction of the longitudinal axis and away from the pivot whilst the rubber plug is resting on the surface of the paper. The arm carries a load of 1 kilogram directly above the spike, while results in a loading of about 28 lb./sq. in. on the rubber surface in contact with the paper. The paper strip is attached at one end to a flat metal plate and the plate and affixed paper is drawn beneath the loaded rubber plug at a rate of about 85 inches per minute.

A suitable instrument which may be adapted to determine the abrasion resistance by this method is the "Paint Hardness Tester" manufactured by Research Equipment (London) Ltd., Hampton Hill, Middlesex, England.

EXAMPLE 2

20 parts of a hydroxy-ended dimethylpolysiloxane of penetration value 90 dissolved in 180 parts of dry toluene, 0.8 part of stannous octoate, 0.03 part water and 0.182 part of the polymethylsiloxane used in Example 1 were reacted together in the manner described in Example 1. There was thus obtained a solution of viscosity 2200 cs. at 25° C.

This solution remained fluid for more than two months after preparation and imparted an excellent non-migratory release finish with good resistance to abrasion when deposited on vegetable parchmant or a yellow kraft paper at a coating weight of about 1 g. of siloxane per square metre and after a cure of 3 minutes at 60° C. and for 1 day at 20–25° C.

EXAMPLE 3

The procedure of Example 2 was repeated except that the amount of stannous octoate was 0.4 part and the amount of water 0.06 part. A solution similar to that obtained in Example 2 was thus obtained.

This solution remained fluid for more than two months after preparation and imparted an anti-stick effect to paper similar to that obtained when using compositions prepared as described in Example 2.

EXAMPLE 4

20 parts of the hydroxy-ended dimethylpolysiloxane used in Example 1 dissolved in 180 parts of dry toluene were reacted with 1.0 part of stannous octoate, 0.03 part water and 0.18 part of the polymethylsiloxane used in Example 1 in the manner described in that example. There was thus obtained a solution of viscosity 555 cs. at 25° C.

A siloxane film with good resistance to abrasion was obtained when this solution was deposited on a glazed cream paper at a coating weight of about 1 g. of siloxane per square metre and aged for 1 hour at 20–25° C.

EXAMPLE 5

30 parts of the dimethylpolysiloxane used in Example 1 were dissolved in 270 parts of toluene and the water present removed by azeotropic distillation, the solvent being returned to the solution. The solution was then cooled to 74° C. and the temperature thereafter maintained at 75 to 77° C. A solution of 0.8 part of stannous octoate in 1.6 parts toluene was added to the continuously stirred solution and after 10 minutes 0.05 part of water was added. 1.36 parts of a 10 percent solution in toluene of the linear methylpolysiloxane used in Example 1 were added after a further 20 minutes and the mixture thereafter heated at 75–77° C. for 1.5 hours and a sample removed. Immediately after removal of the sample a further 3.6 parts of the 10 percent solution of the methyl polysiloxane were added and heating and stirring continued for a further 1.75 hours. The viscosity of the sample was 633 cs. at 25° C. and that of the final solution 11,000 cs. at 25° C.

The solution remained fluid for more than 3 months after preparation and imparted excellent anti-stick properties to an L.S. lazed cream paper at a coating weight of about 1 g. siloxane per square metre.

EXAMPLE 6

A solution of 30 parts of hydroxy-ended dimethylpolysiloxane, of penetration value 2,500, in 250 parts of toluene was heated to remove water present by azeotropic distillation, the solvent being returned to the solution. The solution was then cooled to 70° C. and thereafter maintained at 70 to 80° C. 0.6 part of stannous octoate dissolved in 1.8 part of dry toluene was added to the stirred mixture and after 15 minutes 0.05 part of water was added. After a further 30 minutes 6 parts of a 10 percent solution of a trimethylsilyl-ended polydimethyl siloxane/methylsiloxane copolymer of viscosity 54 cs. at 25° C. and active hydrogen content 0.50 percent (of average composition 1 trimethylsilyl, 1 trimethylsiloxy, 40 methylsiloxy and 58 dimethylsiloxy units). After 45 minutes a further 24 parts of the 10 percent solution of the dimethylsiloxane copolymer was added. The mixture was heated and stirred for a further two hours at 70 to 80° C. The viscosity of the final product was 1530 cs. at 25° C.

EXAMPLE 7

100 parts of a hydroxy-ended dimethylpolysiloxane of penetration value 900 dissolved in 900 parts of white spirit, 2 parts of stannous octoate, 0.2 part water and 0.8 part of the polymethylsiloxane used in Example 1 were reacted together in the manner described in Example 1. There was thus obtained a solution of viscosity 1880 cs. at 25° C., which was particularly suitable for producing a release coating for paper.

EXAMPLE 8

100 parts of a hydroxy-ended dimethylpolysiloxane of of viscosity 3,500 cs. dissolved in 900 parts of toluene, 2 parts of stannous ocotate, 0.3 part water and 0.9 part of the polymethylsiloxane used in Example 1 were reacted together in the manner described in Example 1. There was thus obtained a solution of viscosity 100 cs. at 25° C., which air dried to give an elastomeric film when spread on aluminum foil.

EXAMPLE 9

150 parts of a 10 percent solution of a hydroxy ended polydimethylsiloxane, penetration 800, in xylene were dried by azeotropic distillation and the solution cooled at 25° C., the dry solvent being returned to the solution. 0.015 part of water were added, followed by 3 parts of a 10 percent solution of stannous octate in xylene and 1.4 parts of a 10 percent solution in xylene of the methylpolysiloxane fluid described in Example 1. The temperature was raised slowly to 100° C. over 2 hours and the mixture thereafter cooled. There was thus obtained a fluid of viscosity 1825 cs. at 25° C.

EXAMPLE 10

A solution of 20 parts of a hydroxy ended dimethyl polysiloxane, penetration 900, in 180 parts of perchloroethylene were distilled and the water removed from the azeotrope by passing the distillate through a molecular sieve. The dry distillate was returned to the reaction vessel. The solution was cooled to 70° C. and 0.4 part of stannous octoate dissolved in 1.2 parts perchlorethylene were added followed, at 15 minute intervals, by 0.06 part water and then 0.18 part of the methylpolysiloxane fluid described in Example 1. The mixture was maintained at 69–72° C. for a further 2 hours whereby there was obtained a viscous solution which formed elastomeric films when spread on a glass surface and allowed to air dry at 200° C.

EXAMPLE 11

100 parts of a hydroxy-ended dimethylpolysiloxane of penetration value 900 dissolved in 900 parts of dry toluene, 3.25 parts of stannous versatate, 0.2 part water and 0.9 part of the polymethylsiloxane used in Example 1 were reacted together in the manner described in Example 1. There was thus obtained a solution of viscosity 1300 cs. at 25° C. When spread on aluminum foil this solution air dried to give an elastomeric film.

What we claim is:

1. A process for the production of a stable organosilicon solution comprising reacting together, at a temperature of about 50 to about 100° C., in an organic solvent 100 parts by weight of a diorganopolysiloxane having at least two silicon-bonded hydroxyl groups per molecule, up to 2 parts by weight of a linear organopolysiloxane of viscosity not greater than 1,000 cs. at 25° C. and consisting of RHSiO units with or without terminal $R_3SiO_{0.5}$ units or up to a corresponding RHSiO weight content if the linear organopolysiloxane contains $R_2SiO$ units, where R is a monovalent hydrocarbyl radical or substituted monovalent hydrocarbyl radical, 0.45 to 3.0 parts by weight of tin in the form of a solvent-soluble stannous salt of a carboxylic acid and 0.1–0.5 part by weight of water, wherein the total solids content of the solution is up to about 25 percent.

2. A process according to claim 1 wherein the reactants are reacted together for about ½ to 5 hours.

3. A process according to claim 1 wherein said diorganopolysiloxane is dissolved in at least part of said organic solvent, and thereafter to the resultant solution there is added, in order, the stannous salt, the water and the linear organopolysiloxane.

4. A process according to claim 1 wherein the penetration of the diorganopolysiloxane as hereinbefore defined is not more than 3,000.

5. A process according to claim 1 wherein the organo groups in the diorganopolysiloxane are selected from alkyl, aryl, aralkyl, alkaryl, cycloalkyl and alkenyl groups or such groups containing substituents.

6. A process according to claim 5 wherein the organo groups in the diorganopolysiloxane are selected from ethyl, vinyl, phenyl, chlorophenyl, γ-cyanopropyl and trifluoropropyl groups.

7. A process according to claim 1 wherein at least a major proportion of the organo groups in the diorganopolysiloxanes are methyl groups.

8. A process according to claim 7 wherein all the organo groups in the diorganopolysiloxane are methyl groups.

9. A process according to claim 1 wherein the linear organopolysiloxane is end stopped with triorganosilyl groups.

10. A process according to claim 1 wherein the linear organopolysiloxane contains a proportion of diorganosiloxy groups.

11. A process according to claim 1 wherein the organo groups in the linear organopolysiloxane are selected from alkyl, aryl, aralkyl, alkaryl, alkenyl and cycloalkyl groups.

12. A process according to claim 1 wherein the organo groups in the linear organopolysiloxane are ethyl or phenyl groups.

13. A process according to claim 1 wherein the organo groups in the linear organopolysiloxane are methyl groups.

14. A process according to claim 1 wherein the stannous salt is stannous oleate, stannous stearate or stannous versatate.

15. A process according to claim 1 wherein the stannous salt is stannous octoate.

16. A process according to claim 1 wherein the amount of stannous salt is from 0.6 to 1 part by weight of tin per 100 parts by weight of the diorganopolysiloxane.

17. A process according to claim 1 wherein the solvent is selected from white spirit, benzene, xylene, carbon tetrachloride and trichlorethylene.

18. A process according to claim 1 wherein the solvent is toluene.

19. A process according to claim 1 wherein the total solids content is from 8 to 14 percent by weight.

20. A process according to claim 1 wherein the temperature is from 60 to 80° C.

21. Organosilicon compositions whenever produced by a process as claimed in claim 1.

References Cited

UNITED STATES PATENTS

| | | | |
|---|---|---|---|
| 2,803,614 | 8/1957 | Solomon | 260—46.5 |
| 2,902,468 | 9/1959 | Fianu | 260—46.5 |
| 2,967,170 | 1/1961 | Merker | 260—46.5 |
| 2,985,545 | 5/1961 | Leavitt | 260—46.5 |

FOREIGN PATENTS 519,188  12/1955  Canada.

MORRIS LIEBMAN, *Primary Examiner.*

L. T. JACOBS, *Assistant Examiner.*

U.S. Cl. X.R.

260—33.8, 18, 46.5